United States Patent [19]

Miki

[11] Patent Number: 5,297,242
[45] Date of Patent: Mar. 22, 1994

[54] DMA CONTROLLER PERFORMING DATA TRANSFER BY 2-BUS CYCLE TRANSFER MANNER

[75] Inventor: Yoshiyuki Miki, Tokyo, Japan

[73] Assignee: NEC Corporation, Tokyo, Japan

[21] Appl. No.: 626,957

[22] Filed: Dec. 13, 1990

[30] Foreign Application Priority Data

Dec. 15, 1989 [JP] Japan .................. 64-326893

[51] Int. Cl.$^5$ .................................................. G06F 13/28
[52] U.S. Cl. .................... 395/425; 364/DIG. 1; 364/242.31; 364/242.3; 364/DIG. 2
[58] Field of Search ... 364/200 MS File, 900 MS File; 395/200, 275, 425

[56] References Cited

U.S. PATENT DOCUMENTS

| | | | |
|---|---|---|---|
| 4,491,909 | 1/1985 | Shimizu ..................... | 395/425 |
| 4,598,362 | 7/1986 | Kinjo et al. ................ | 395/250 |
| 4,912,632 | 3/1990 | Gach et al. ................ | 395/425 |
| 4,933,846 | 6/1990 | Humphrey et al. ......... | 395/325 |
| 4,987,529 | 1/1991 | Craft et al. ................ | 395/325 |
| 5,214,767 | 5/1993 | Wanner et al. ............. | 395/425 |

OTHER PUBLICATIONS

M. Morris Manno, computer system architecture, 2nd edition, 1982, pp. 403-473.

*Primary Examiner*—Joseph L. Dixon
*Assistant Examiner*—Matthew M. Kim
*Attorney, Agent, or Firm*—Whitham & Marhoefer

[57] ABSTRACT

A Direct Memory Access (DMA) controller (1) of a 2-bus cycle transfer type executes a read cycle first to fetch data from a data source then internally rearranges or aligns the fetched data in accordance with a bus width and/or a storing address of a data destination unit and thereafter executes a write cycle to write the rearranged data in the data destination unit. The DMA controller includes a data register (106) having first and second fields (106-1 and 106-2). Data from the data source is temporarily stored in one of the first and second fields of the data register during the read cycle, and data in the other of the first and second fields is written to the data destination unit during the write cycle.

4 Claims, 6 Drawing Sheets

| WP/RP | PW/BW | W10/R10 | W11/R11 | W12/R12 | W13/R13 | W20/R20 | W21/R21 | W22/R22 | W23/R23 |
|---|---|---|---|---|---|---|---|---|---|
| 000 | 0 0<br>0 1<br>1 0 | 1<br>1<br>1 | 0<br>1<br>1 | 0<br>0<br>1 | 0<br>0<br>1 | 0<br>0<br>0 | 0<br>0<br>0 | 0<br>0<br>0 | 0<br>0<br>0 |
| 001 | 0 0<br>0 1<br>1 0 | 0<br>0<br>0 | 1<br>1<br>1 | 0<br>1<br>1 | 0<br>0<br>1 | 0<br>0<br>1 | 0<br>0<br>0 | 0<br>0<br>0 | 0<br>0<br>0 |
| 010 | 0 0<br>0 1<br>1 0 | 0<br>0<br>0 | 0<br>0<br>0 | 1<br>1<br>1 | 0<br>1<br>1 | 0<br>0<br>1 | 0<br>0<br>1 | 0<br>0<br>0 | 0<br>0<br>0 |
| 011 | 0 0<br>0 1<br>1 0 | 0<br>0<br>0 | 0<br>0<br>0 | 0<br>0<br>0 | 1<br>1<br>1 | 0<br>1<br>1 | 0<br>0<br>1 | 0<br>0<br>1 | 0<br>0<br>0 |
| 100 | 0 0<br>0 1<br>1 0 | 0<br>0<br>0 | 0<br>0<br>0 | 0<br>0<br>0 | 0<br>0<br>0 | 1<br>1<br>1 | 0<br>1<br>1 | 0<br>0<br>1 | 0<br>0<br>1 |
| 101 | 0 0<br>0 1<br>1 0 | 0<br>0<br>1 | 0<br>0<br>0 | 0<br>0<br>0 | 0<br>0<br>0 | 0<br>0<br>0 | 1<br>1<br>1 | 0<br>1<br>1 | 0<br>0<br>1 |
| 110 | 0 0<br>0 1<br>1 0 | 0<br>0<br>1 | 0<br>0<br>1 | 0<br>0<br>0 | 0<br>0<br>0 | 0<br>0<br>0 | 0<br>0<br>0 | 1<br>1<br>1 | 0<br>1<br>1 |
| 111 | 0 0<br>0 1<br>1 0 | 0<br>1<br>1 | 0<br>0<br>1 | 0<br>0<br>1 | 0<br>0<br>0 | 0<br>0<br>0 | 0<br>0<br>0 | 0<br>0<br>0 | 1<br>1<br>1 |

DATA INPUT/OUTPUT OF DECODERS OF FIGURE 3

FIG.4

DMA CONTROLLER PERFORMING DATA TRANSFER BY 2-BUS CYCLE TRANSFER MANNER

BACKGROUND OF THE INVENTION

The present invention relates to a DMA (Direct Memory Access) controller and, particularly, to a DMA controller which executes a DMA data transfer according to a 2-bus cycle transfer manner.

As well known in the art, a DMA controller is used for executing a data transfer between a peripheral input-/output device (referred to as "peripheral I/O", hereinafter) such as a magnetic disc device, a communication device, or display device and a main storage device (referred to as "memory", hereinafter) in lieu of a central processing unit (CPU).

With improvement of processing efficiency and speed of CPU, a data bus width thereof is increased to 32 bits, for example. When an information processing system is constructed by using a CPU having such a large data bus width, not all of the peripheral I/Os to be used in the same system may have the same bus width as that of the CPU. For example, peripheral I/Os having 8-bit (1-byte) and/or 16-bit (half word) bus width may be used for a CPU having 32-bit (1 word) bus width. In such case, a DMA data transfer is required between a memory and peripheral I/Os having bus widths different from each other.

To this end, a DMA controller of a 2-bus cycle transfer type is used. The 2-bus cycle transfer system is such that the data transfer is performed by a read bus cycle and a write bus cycle. Such DMA controller executes the read cycle first to fetch data from a data source unit such as a memory or a peripheral I/O, then internally rearranges or aligns fetched data in accordance with a bus width and/or a storing address of a data destination unit such as a peripheral I/O or a memory, and thereafter executes the write bus cycle to write the rearranged data in the data destination unit.

Thus, the DMA controller of the 2-bus cycle transfer type is required to rearrange or align the data fetched from the data source unit in order to perform a DMA transfer between ,the peripheral I/O and the memory having different bus widths. This rearrangement or alignment procedure can be completed within a read cycle if the operating frequency is low. However, when, in order to improve the transfer speed, the bus cycle is shortened by increasing operating frequency, it becomes impossible to complete such a rearrangement or alignment within the read bus cycle and, therefore, it is necessary to provide a time interval between the two bus cycles for such rearrangement. That is, it is impossible to execute the read bus cycle and the write bus cycle continuously, so that the improvement in transfer speed is restricted.

SUMMARY OF THE INVENTION

Therefore, an object of the present invention is to provide an improved DMA controller.

Another object of the present invention is to provide a DMA controller of 2-bus cycle transfer type for executing successive bus cycle operations of a read bus cycle and a write bus cycle.

A DMA controller according to the present invention comprises a data register having a first field and a second field for temporally storing data to be transferred, means for reading data from a data source unit such as a memory (or a peripheral I/O) by executing a read bus cycle to store the read-out data in one of the first and second fields of the data register, and means for writing the data stored in the other of the first and second fields of the data register into a data destination unit such as a peripheral I/O (or a memory) by executing a write bus cycle subsequent to the read bus cycle.

That is, in the present invention, data, which has been read from the data source unit and stored in the data register by a preceding read bus cycle executed prior to a current read bus cycle, is then transferred and written into the data destination unit by a write bus cycle subsequent to the current read bus cycle. Therefore, there is no need of providing a time for the arrangement processing of data read out by the read bus cycle and thus it is possible to execute successive operations of a read bus cycle and a write bus cycle.

BRIEF DESCRIPTION OF THE DRAWINGS

FIG. 4 is a diagram showing a relation between input data and output data of decoders shown in FIG. 3.

DETAILED DESCRIPTION OF THE PREFERRED EMBODIMENTS

Figure 1:
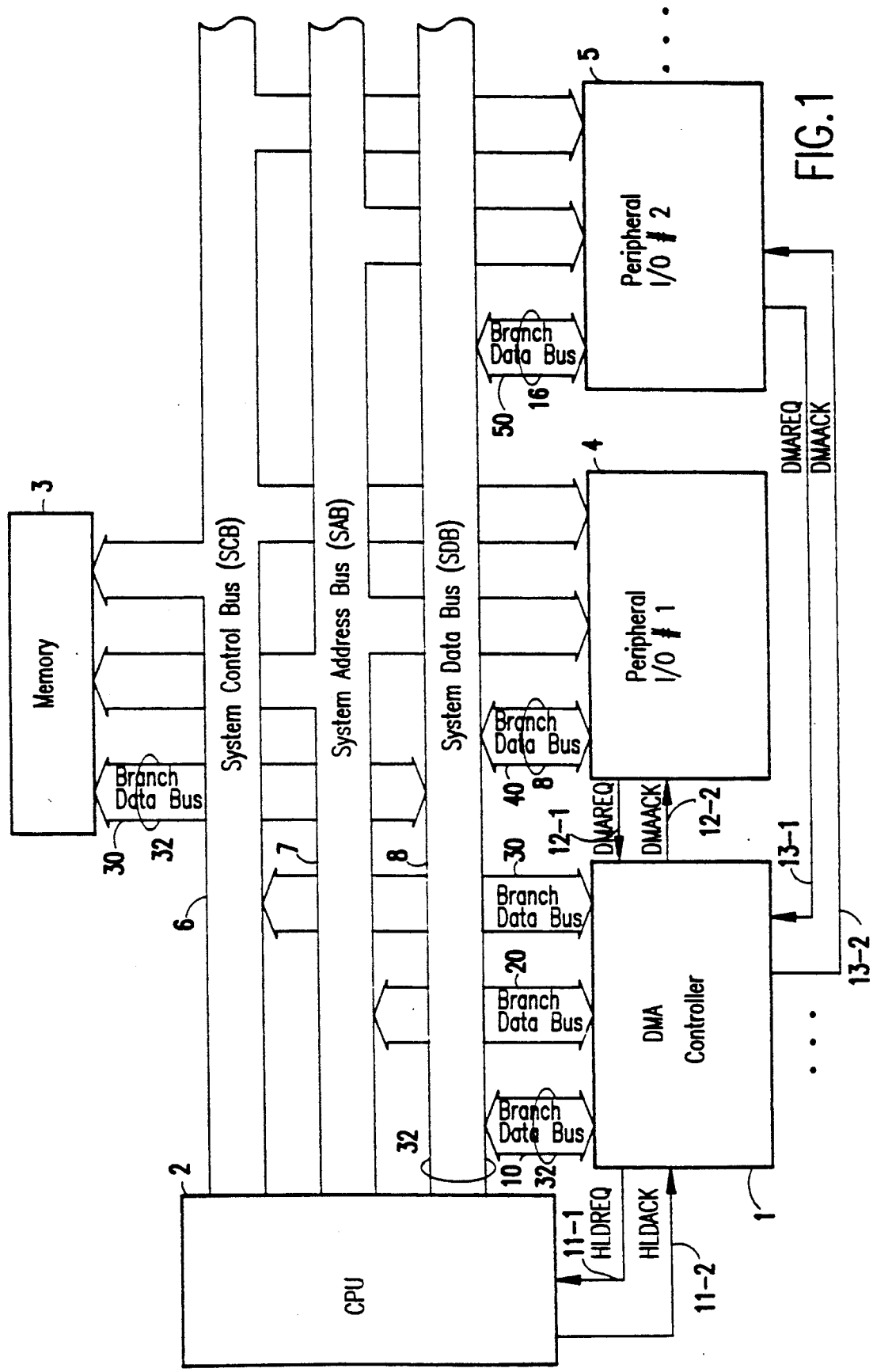
FIG. 1 is a block diagram of an information processing system using a DMA controller according to an embodiment of the present invention.

Referring to FIG. 1, there is shown a block diagram of an information processing system using a DMA controller 1 according to an embodiment of the present invention. In addition to the DMA controller 1, this system includes a CPU 2, a memory 3 and a plurality of peripheral I/Os (only two I/Os 4 and 5 are shown in FIG. 1), and these components are interconnected through a system control bus (SCB) 6, a system address bus (SAB) 7 and a system data bus (SDB) 8 32 bits (4-byte) wide. Since data of 4 bytes (1-word) are read and written from and into the memory 3 by one bus cycle, the memory 32 is connected through a branch data bus 30 of 32-bit width to SDB 8. Data widths of the first and second peripheral I/Os 4 and 5, i.e., port width thereof, are 1 byte and 2 bytes, respectively, in this embodiment. Therefore, the peripheral I/O 4 and the peripheral I/O 5 are connected through a branch data bus 40 of 8-bit width to the least significant 1-byte data bus of SDB 8 and through a branch data bus 50 of 16-bit width to the least significant 2-byte data busses of the SDB 8, respectively. The DMA controller 1 executes data transfer between the memory 3 and the first peripheral I/O 4, between the memory 3 and the second peripheral I/O 5, between the memory 3 and other peripheral I/Os (not shown), or between two storage regions within the memory 3, and is thus connected through a branch data bus 10 of 32-bit width to the SDB 8. The DMA controller 1 responds to a DMA transfer request signal (DMAREQ) 12-1 or 13-1 to detect a DMA request from the corresponding peripheral I/O 4 or 5.

When the request is detected, the DMA controller 1 sends a hold request signal (HLDREQ) 11-1 to the CPU 2 to request control of the system buses 6 to 8. When the CPU 2 detects the HLDREQ signal 11-1, it suspends program execution and then allows the DMA controller 1 to have control of the buses 6 to 7 returning a hold acknowledge (HLDACK) signal 11-2. Thus, the DMA controller 1 returns the DMA acknowledge (DMAACK) signal 12-2 or 13-2 to the requesting peripheral I/O 4 or 5 and executes a DMA data transfer.

Figure 2:
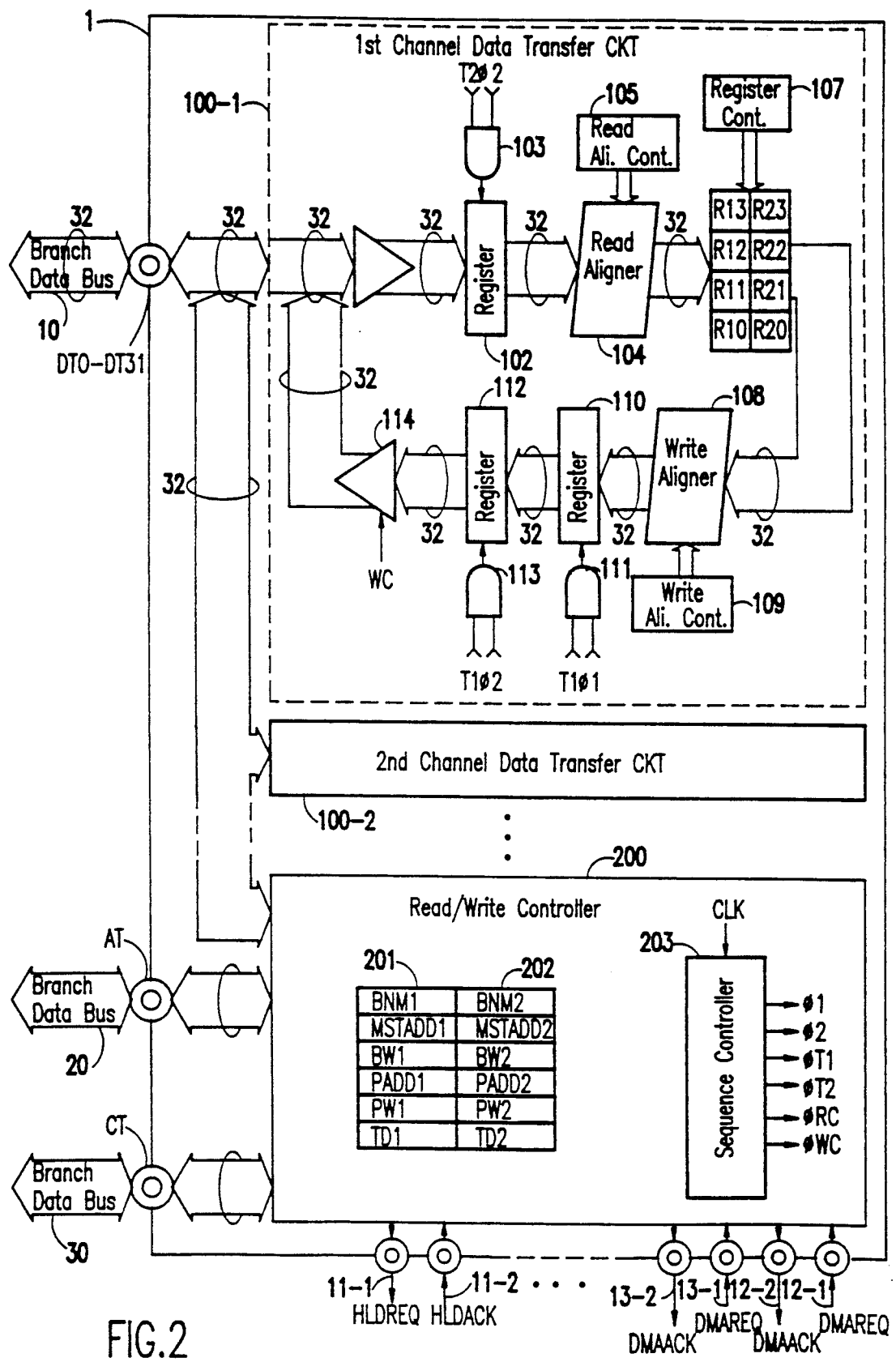
FIG. 2 is a block diagram showing an internal construction of the DMA controller shown in FIG. 1.

Referring to FIG. 2, the DMA controller 1 includes data transfer circuits 100-1 and 100-2 for respective ones of a plurality of DMA channels and a read/write controller 200. The first and second channel data transfer circuits 100-1 and 100-2 are assigned to the first and second peripheral I/Os 4 and 5, respectively, in this embodiment. These transfer circuits have identical construction and, therefore, the construction of only the circuit 100-1 is shown. Specifically, an input buffer 101 receives data from the bus 10 through 32 data terminals DT0 to DT31 and supplies them to a register 102. The register 102 responds to a latch enable signal from an AND gate 103 supplied with a second clock $\phi 2$ and a second state signal T2 to temporarily store data from the input buffer 101. The data from the register 102 is subjected to a byte alignment operation (i.e., a byte shift operation) by a read aligner 104 responsive to a control data from a read aligner controller 105 and then supplied to a data register 106. The register 106 includes a first field 106-1 and a second field 106-2 in accordance with the present invention. The first field 106-1 includes four registers R10 to R13 each of 1-byte (8 bits) width and the second field 106-2 includes four registers R20 to R23 each of 1-byte (8 bits) width. The location and the number of the registers R10 to R20, into which data from the read aligner 104 are to be written and from which data are to be read to a write aligner 108, are controlled by a register controller 107. The write aligner 108 executes a data alignment operation (i.e., a data shift operation) on data read from the register 106 in response to a control data from a write aligner controller 109. The data from the write aligner is temporarily stored into a register 110. A latching timing of the register 110 is controlled by an AND gate 111 having inputs supplied with a first clock $\phi 1$ and a first state signal T1. An output data of the register 110 is temporarily stored in a register 112 under the control of an AND gate 113 having inputs supplied with the second clock $\phi 2$ and the first state signal T1 and then transferred through an output buffer 114 activated by a write bus cycle signal WC to the data terminals DT0 to DT31 (bus 10).

Figure 5:
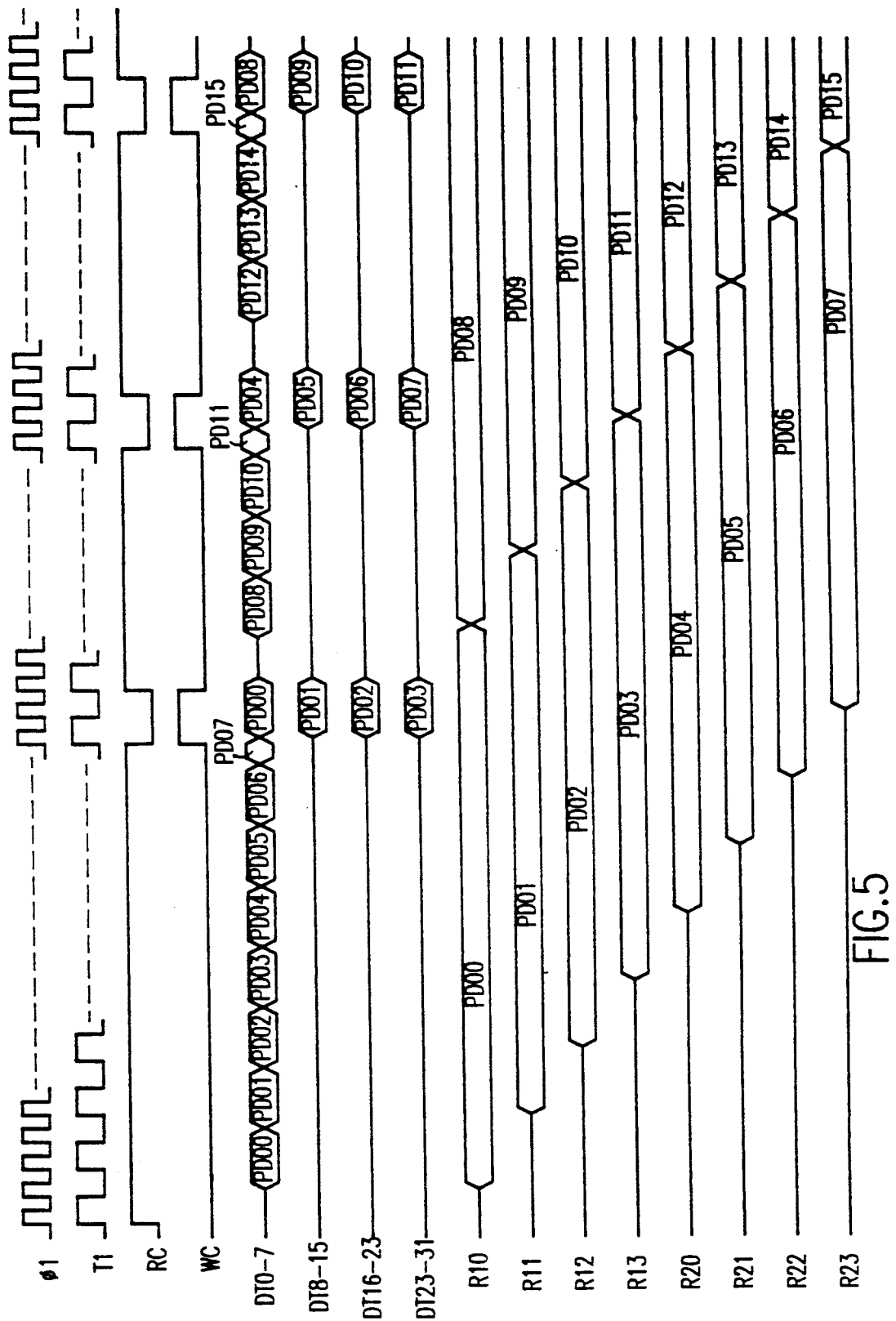
FIG. 5 is a timing chart showing an example of DMA data transfer operation by the DMA controller according to this embodiment.
Figure 6:
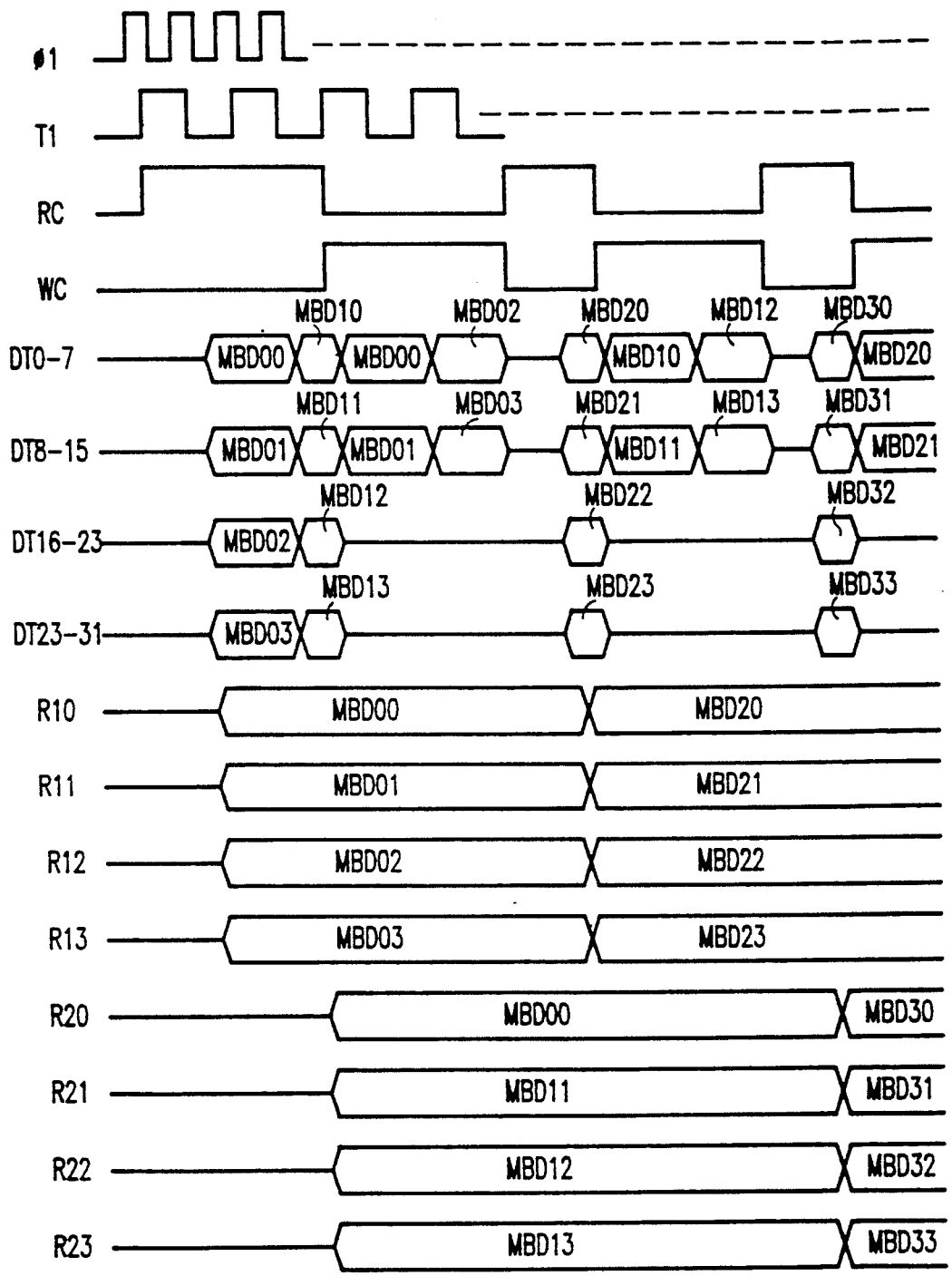
FIG. 6 is a timing chart showing another example of DMA data transfer operation by the DMA controller according to this embodiment.

The read/write controller 200 includes a plurality of parameter registers 201 and 202, which correspond to the respective DMA transfer channels, and a sequence controller 203 for controlling an operation sequence/timing of DMA transfer. Each of the parameter registers 201 and 202 stores a plurality of information representative of the number of bytes to be transferred (BNM), a start address of a data transfer memory region (MSTADD), a bus width indicative of the bit width of the memory (BW), a port address (PADD) indicative of the address of a peripheral I/O, a port width (PW) indicative of the bit width of the peripheral I/O, and a transfer direction (TD) indicative of a direction of data transfer from a memory to a peripheral I/O or from a peripheral I/O to a memory. These informations are set by the CPU 2 (FIG. 1). The sequence controller 203 responds to a basic or system clock signal CLK to generate various control signals for DMA transfer. However, only timing control signals $\phi 1$, $\phi 2$, T1, T2, RC and WC to be supplied to the data transfer circuits 100 and 200 are shown in the drawing. The first and second clock signals $\phi 1$ and $\phi 2$ have a phase relationship opposite to each other. The first and second state signals T1 and T2 also have a phase relationship opposite each other. The signal RC represents a read bus cycle period, and WC represents a write bus cycle period. A phase relation between the signals $\phi 1$ and T1 (or $\phi 2$ and T2) is shown in FIGS. 5 and 6.

Figure 3:
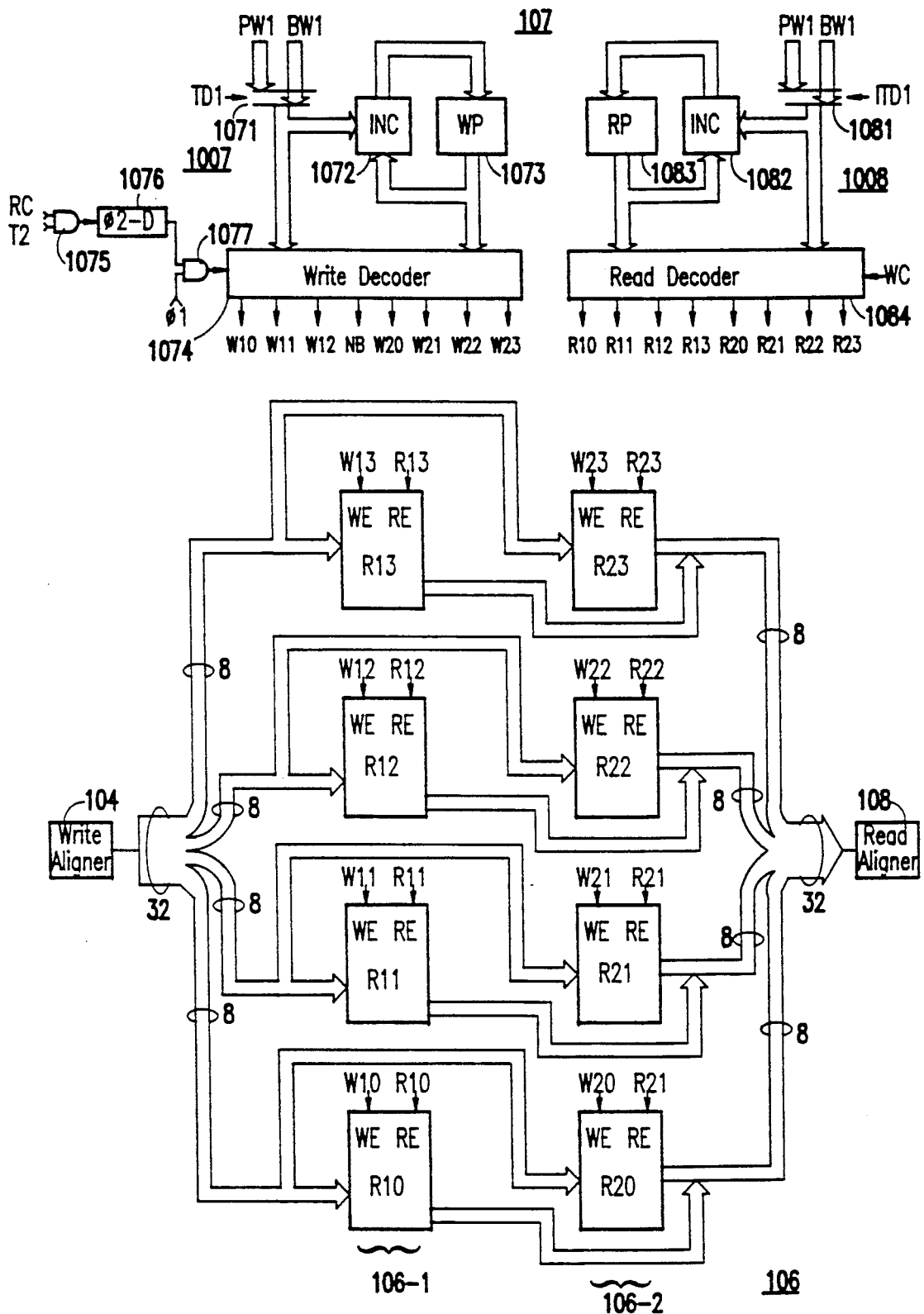
FIG. 3 is a block diagram showing a register controller and a data register shown in FIG. 2.

Referring to FIG. 3, there is shown in detail a construction of the register controller 107 and the data register 106. The register controller 107 includes a write control circuit 1007 for controlling a write operation of data a read from a data source unit by read bus cycle into the data register 106, and a read control circuit 1008 for controlling a read operation of data from the data register 106 by a write bus cycle. The write control circuit 1007 includes a write pointer (WP) 1073, an incrementer (INC) 1072, a multiplexer (MPX) 1071, a write decoder 1074, an AND gate 1075 for generating a write enable signal to be supplied to the decoder 1074, a $\phi 2$ delay circuit ($\phi 2$-D) 1076, and an AND gate 1077. MPX 1071 selects and outputs the port width PW when the data transfer direction TD is "1" to designate the data transfer from a memory to a peripheral I/O. On the other hand, when TD is "0" to designate the data transfer from a peripheral I/O to a memory, MPX 1071 selects and outputs the bus width BW. Each of the port width PW and bus width BW consists of 2 bits, with "00" being a 8-bit width, "01" being a 16-bit width and "10" being a 32-bit width. INC 1072 increments the content of WP 1073 by a value responsive to the output data from MPX 1071 and rewrites the incremented value into WP 1073. WP 1073 is of 3 bits construction. When the output of MPX 1071 is "00", the content of WP 1073 is incremented by 1, when "01", incremented by 2, and when "10", incremented by 4. The write decoder 1074 responds to the content of WP 1073 and the output data of MPX 1071 to control levels of 8 write-enable signals W10 to W23 in accordance with FIG. 4. These signals W10 to W23 are supplied to write-enable terminals WE of the registers R10 to R23, respectively. The read control circuit 1008 includes a read pointer (RP) 1083, an incrementer (INC) 1082, a multiplexer (MPX) 1081 and a read decoder 1084. The decoder 1084 is activated by the signal WC. MPX 1081 selects the port width PW when ITD, which is an inverse data of the data transfer direction Td, is "1" and selects the bus width BW when it is "0". An update operation for RP 1083 by INC 1082 is the same as that for WP 1073 by INC 1072. The read decoder 1084 responds to the data from RP 1083 and MPX 1081 to control levels of 8 read-enable signals R10 to R23 in accordance also with FIG. 4. These read-enable signals R10 to R23 are supplied to read-enable terminals RE of the registers R10 to R23, respectively. Thus, each of the registers R in the data register 106 stores the corresponding byte data among data from the read aligner 104 when the corresponding write-enable signal W is "1" and supplies the stored data to the write aligner 108 when the corresponding read-enable signal R is "1".

Although not shown, the read aligner controller 105 (FIG. 2) receives the least significant 2-bit data of the output of WP 1073 and the write aligner controller 109 receives the least significant 2-bit data of the output of RP 1083. When the least significant 2-bit data of WP 1073 is "00", the read aligner controller 105 commands the read aligner 104 to output the data from the register 102 as they are. When the least significant 2 bits of WP 1073 is "01", "10" or "11", the controller 105 commands the read aligner 104 to shift the data from the register 102 by one byte, two bytes, or three bytes toward the most significant byte, respectively. Similarly, when the least significant 2-bit data is "00", "01", "10", or "11", the write aligner controller 109 commands the write aligner 108 to shift the data from the register 106 by zero byte, one byte, two bytes, or three bytes toward the most significant byte, respectively.

An operation will be described with an assumption that the first channel of the DMA controller 1 is allocated to a data transfer from the first peripheral I/O 4 to the memory 3 and the second channel thereof is allocated to a data transfer from the memory 3 to the second peripheral I/O 5. First, CPU 2 sets, in the parameter register 201, the number of bytes to be transferred (BUM1), a start address of a data destination region of the memory 3 (MSTADD1), "10" for the bus width BW1, the port address of the peripheral I/O 4 (PADD1), "00" for port width PSW1, and "1" for the transfer direction DT, as an initial setting operation for the DMA controller 1. Further, the number of bytes to be transferred (BNM2), the start address of a data source region of the memory 3 (MSTADD2), "10" for the bus width BW2, the port address of the peripheral I/O 5 (PADD2), "01" for the port width PSW2, and "0" for the transfer direction DT2 are set in the parameter register 201. With these settings, the DMA controller 1 is ready to execute a DMA transfer.

When the peripheral I/O 4 makes DMAREQ signal 12-1 active to request a data transfer, the DMA controller 1 makes HLDREQ signal 11-1 active to get the right of usage of the buses 6 to 8 from CPU 2. In response to this, the CPU 2 suspends program execution and informs to the DMA controller 1 that control of the bus is given to the DMA controller by making HLDACK signal 11-2 active.

As a result, the DMA controller 1 executes the data transfer from the peripheral I/O 4 to the memory 3 in accordance with a timing chart shown in FIG. 5. In this embodiment, a unit read or write bus cycle of the DMA controller 1 is executed in 2 clocks of clock $\phi 1$ ($\phi 2$) including each of T1 and T2 states. A data source or designation address is outputted in a T1 state and data is read or written in the T2 state. Further, a corresponding DMAACK signal 12-2 (13-2) is outputted in synchronism with a start of T1 state. Although, in the system shown in FIG. 1, DMAACK signal 12-2 (13-2) is supplied to the peripheral I/O 4 (5) to indicate an access, it is possible to make an access by decoding the port address PADD1 (PADD2).

The DMA controller 1 activates first a read bus cycle. Therefore, the sequence controller 203 makes RC signal active (high level) and WC signal inactive (low level), respectively. Upon this, data PD00 is read out from the peripheral I/O 4 and supplied through the busses 40, 8 and 10 to the data terminals DT of the DMA controller 1. At this time, since the peripheral I/O 4 is of 8-bit bus width, eight bits of valid data PD00 from the I/O 4 are supplied to the data terminals DT0 to DT7, respectively, the other data terminals Dt8 to 31 being meaningless. As is clear from the description of FIGS. 3 and 4, the data PD00 is stored through the register 102 and the aligner 104 in the data register R10.

Data of 8-bit (1-byte) width is read from the peripheral I/O 4 for each read bus cycle and data of 32-bit (4-byte width) can be written in the memory 3 for each write bus cycle. Therefore, the DMA controller 1 executes 4 unit bus cycles continuously in the read mode for the peripheral I/O 4 allocated as a data source. Moreover, in order to continuously execute a read bus cycle and a write bus cycle, the data register 106 includes two fields 106-1 and 106-2 each having a capacity of 4-bytes. Therefore, upon a DMA request from the peripheral I/O 4, the controller 1 performs, as an initial operation, eight unit bus cycles continuously in read mode as shown in FIG. 5. Thus, data PD00 to PD07 corresponding to 8 bytes are read from the peripheral I/O 4 and then supplied to the data terminals DT0-7 sequentially. These data PD00-PD07 are stored temporarily in the registers R10-R23 of the data register 16, as mentioned with reference to FIGS. 3 and 4.

Subsequent to this read bus cycle, a unit write bus cycle is executed by making signals RC and WC high and low levels, respectively. In this cycle, since the read decoder 1084 outputs four read-enable signals R10 to R13 of "1", data PD01 to PD03 are read from the registers R10 to R13 in the first field 106-1 and then outputted from the data terminals DT0 to DT31 through the write aligner 108, the registers 110 and 112 and the output buffer 113, finally being written into the memory 3.

Successively four unit read bus cycles are executed, so that the next four bytes of data PD08 to PD11 are read from the peripheral I/O 4 and then stored temporarily in the registers R10 to R13 in the first field 106-1, respectively. A unit write bus cycle is then executed, so that the data PD04 to PD08 are read respectively from the registers R20 to R23 in the second field 106-2 and then written in the memory 3. Thereafter, four bytes of data PD12 to PD15 are read from the peripheral I/O 4 in a next read bus cycle and then stored in the registers R20 to R23 in the second field, respectively. Such operations are repeated until the data transfer bytes, the number of bytes of which is represented by transfer byte number information BNM1, is completed. In this manner, the read bus cycle and the write bus cycle can be executed successively or continuously regardless of the existence of the registers 102, 110 and 112 for the data fetching and the timing matching and the aligners 104 and 108 for the data arrangement.

It should be noted that the read/write controller 200 checks the level of DMAREQ signal 12-1 from the peripheral I/O 4 every unit bus cycle. Therefore, when the peripheral I/O 4 makes the signal 12-1 inactive, the controller 200 suspends the data transfer operation and makes HLDREQ signal 11-1 inactive to return control of the bus to CPU 2. For example, if DMAREQ signal 12-1 becomes inactive during the execution of the read bus cycle for data PD09, the data transfer operation is suspended at a time when data PD09 is fetched in the register R11, and control of the bus is returned to the CPU 2. When the peripheral I/O 4 thereafter makes the DMAREQ signal 12-1 active again, the controller 1 acquires control of the bus from the CPU 2 and restarts the transfer operation from the read bus cycle for the data PD10. In addition, if the number of bytes to be transferred is indicated by the information BNM1 as being 6, a write bus cycle is executed subsequently to the read bus cycle for the data PD05, so that data PD00 to PD03 are written into the memory 3, followed by a further write bus cycle to write the data PD04 and PD05 into the memory 3.

For a DMA data transfer from the memory 3 to the peripheral I/O 5, the system operates in accordance with the timing chart shown in FIG. 6. Specifically, the DMA controller 1 first executes a read bus cycle to read data to be transferred from the memory 3. Since the memory 3 is of 32-bit width, four bytes of data MBD00 to MBD03 are read and stored simultaneously in the registers R10 to R13 of the first field 106-1 in the second channel transfer circuit 100-2 through the data terminals DT0 to DT31, respectively. As mentioned previously, in the initial operation, the read bus cycle is executed again, so that next four bytes of data MBD10 to MBD13 are stored in the registers R20 to R23 of the second field 106-2, respectively. Successively, a write bus cycle is executed. As described with reference to FIGS. 3 and 4, the data MBD00 and MBD01 are read from the registers R10 and R11 and transferred to the peripheral I/O 5. A write bus cycle is executed again, so that the data MBD02 and MBD03 from the registers R12 and R13 are supplied to the peripheral I/O 5. Thereafter, a read bus cycle is executed, and the next four bytes of data MBD20 to MBD23 from the memory 3 are stored in the registers R10 to R13 of the first field 106-1. Through the subsequent two unit read bus cycles, the data MBD10 and MBD11 from the registers R20 and R21 and the data MBD12 and MBD13 from the registers R22 and R23 are sequentially transferred to the peripheral I/O 5.

This operation is also controlled according to DMA-REQ signal 13-1 from the peripheral I/O 5 and the number of transfer bytes indicated by the information BNM2, as mentioned previously.

As described hereinbefore, the DMA controller according to the present invention employs 2-bus cycle system including a read bus cycle and a write bus cycle and can execute DMA transfer from a data source unit to a data destination unit by executing both cycles continuously.

The present invention is not limited to the described embodiments, but may be changed and modified without departing from the scope and sprite of the invention. For example, the number of clocks for unit bus cycle may be increased and/or the width of the data bus may be increased. Further, a more efficient data transfer may be executed by using the address information of the DMA transfer region of the memory 3 as a portion of the control information for the controllers 105, 107 and 109.

What is claimed is:

1. A Direct Memory Access (DMA) data transfer controller coupled through a system bus including a data bus to a data source unit and a data destination unit for transferring data from said data source unit to said data destination unit through said data bus, said data source unit being operatively coupled to said data destination unit through said system bus, said data source unit being accessed in L-byte units (L being a positive integer), said data destination unit being accessed in M-byte units (M being a positive integer different from said L) and said data bus having an N-byte length (N being a positive integer not less than one of said L and said M), said data transfer controller comprising:
a data register operatively coupled to said data bus and including a plurality of storage areas, each of said storage areas having a one-byte length;
accessing means operative coupled to said system bus and to said data register for performing a read bus cycle to read L-byte data from said data source coupled to said data bus and a write bus cycle to write M-byte data into said data destination unit coupled to said data bus;
data input means operatively coupled to said data register and to said data bus and activated during said read bus cycle for operatively coupling said data bus to said data register;
write pointer means operatively coupled to said data register and activated during said read bus cycle for simultaneously selecting L storage areas of said data register to thereby cause the selected L storage areas to be written with L-byte data read out from said data source unit;
output means operatively coupled to said data register and activated during said write bus cycle for operatively coupling said data register to said data bus; and
read pointer means operatively coupled to said data register and to said data bus and activated during said write bus cycle for simultaneously selecting M storage areas of said data register to thereby cause the selected M storage areas to supply M-byte data stored therein to said data destination unit.

2. The DMA data transfer controller as claimed in claim 1, wherein said data input means includes a read aligner operatively coupled to said data bus for receiving the L-byte data read out from said data source unit and for shifting the L-byte data such that byte locations of the shifted L-byte data correspond to locations of said selected L storage areas, and
wherein said output means includes a write aligner operatively coupled to said data bus for receiving the M-byte data read out from said selected M storage areas and for shifting the M-byte data such that byte locations of the shifted M-byte data correspond to byte locations of said data bus.

3. A Direct Memory Access (DMA) data transfer controller coupled through a system bus including a data bus to a data source unit and a data destination unit for transferring data from said data source unit to said data destination unit, said data source unit being operatively coupled to said data destination unit through said system bus, said data source unit being accessed in L-byte units (L being a positive integer), said data destination unit being accessed in M-byte units (M being a positive integer larger than said L) and said data bus having an N-byte length (N being a positive integer not less than said M), said controller comprising:
accessing means operatively coupled to said system bus for performing a read bus cycle to read L-byte data from said data source unit and a write bus cycle to write M-byte data into said data destination unit;
a data register operatively coupled to said data bus and to said accessing means and having a plurality of storage areas, each of said storage areas having a one-byte length;
a write pointer operatively coupled to said data bus and to said data register for simultaneously selecting L storage areas of said data register; and
a read pointer means operatively coupled to said data bus and to said data register for simultaneously selecting M storage areas of said data register, said accessing means performing said read bus cycle a plurality of times consecutively with commanding said write pointer to select L storage areas of said data register each time said read bus cycle is performed until said data register stores M-byte data which are read out from said data source unit and thereafter said accessing means performing said write bus cycle at least once with commanding said read pointer to select M storage areas of said data register to write M-byte data read out from said data register into said data destination unit.

4. A Direct Memory Access (DMA) data transfer controller coupled through a system bus including a data bus to a data source unit and a data destination unit for transferring data from said data source unit to said data destination unit, said data source unit being operatively coupled to said data destination unit through said system bus, said data source unit being accessed in L-byte units (L being a positive integer), said data destination unit being accessed in M-byte units (M being a positive integer larger than said L) and said data bus having an N-byte length (N being a positive integer not less than said L), said controller comprising:

accessing means operatively coupled to said system bus for performing a read bus cycle to read L-byte data from said data source unit and a write bus cycle to write M-byte data into said data destination unit;

a data register operatively coupled to said data bus and to said accessing means and having a plurality of storage areas, each of said storage areas having a one-byte length;

a write pointer operatively coupled to said data register for simultaneously selecting L storage areas of said data register; and a read pointer means operatively coupled to said data register and to said data bus for simultaneously selecting M storage areas of said data register, said accessing means performing said read bus cycle at least once with commanding said write pointer to select L storage areas to write L-byte data into the selected L storage areas of said data register and thereafter said accessing means performing said write bus cycle a plurality of times consecutively with commanding said read pointer to select M storage areas each time said write bus cycle is performed to write L-byte data read out from said data register into said data destination unit.

* * * * *